United States Patent Office 3,347,838
Patented Oct. 17, 1967

3,347,838
POLYMERS AND ARTICLES
Keith Jasper Clark, Welwyn Garden City, England, assignor to Imperial Chemical Industries Limited, London, England, a corporation of Great Britain
No Drawing. Filed Apr. 7, 1966, Ser. No. 540,818
2 Claims. (Cl. 260—93.7)

The present invention relates to new polymers and procedures for making the same and for preparing shaped articles therefrom.

Light transmission in crystalline polymers is reduced by light scattering. This scattering occurs because of fluctuations in refractive index affecting beams of light falling on and passing through the polymer. These fluctuations are principally caused by (a) differences in refractive index between the crystalline and amorphous phases of the polymer, (b) anisotrophy of the polymer crystals, which have different refractive indices along different axes, and have their axes pointing in different directions and (c) in certain circumstances, microvoids. The transparency of a thin crystalline polymer fiber or film is often improved by drawing it; the drawing process aligns the polymer crystals so that their axes have the same orientation and the effects of anisotrophy are thereby minimised. However, no crystalline polymers have previously been known which can be formed into unoriented rigid moulded or extruded articles having anything approaching a glass-like transparency.

The principal object of the present invention is to provide novel randomly crystalline spherulitic polymers having a glass-like transparency.

Another object of the invention is to provide new polymers of low density, high melting point, excellent electrical resistivity and dielectric properties, and a high degree of chemical stability, which are transparent when moulded or extruded. A more specific object of the invention is the provision of new forms of poly-4-methyl-pentene-1 as well as procedures for making and melt-shaping the same. Other objects will also be hereinafter apparent.

I have discovered, most surprisingly, that poly-4-methyl-pentene-1 is substantially isotropic, and furthermore, the evidence shows that the refractive index of its crystalline and amorphous phases are substantially identical. I have further discovered as a consequence of this, that by the use of specific de-ashing techniques to reduce the ash content of the polymer to a very low level, it is possible to obtain poly-4-methyl-pentene-1 which has in thick section a glass-like transparency, because its refractive index is substantially the same throughout. It is believed that this is the first time any crystalline polymer has been obtained in a form having a transparency like that of glass. The combination of factors required to bring this about are believed to be so rare that they have never been found before. It is by no means obvious to de-ash poly-4-methyl-pentene-1 to the required low level to make it transparent, as formerly known polyolefines such as high density polyethylene and polypropylene cannot be obtained with glass-like transparency in thick section however low their ash content.

Broadly speaking, the solid crystalline polymers of 4-methyl-pentene-1 prepared according to the present invention are characterised by an ash content of less than 0.02 by weight, a transition metal content below 50 p.p.m., a density of the order of 0.82 to 0.86 gram per cc., a melt flow index (measured by ASTM Method 1238–57T using a 5 kg. weight at 260° C.) of between 0.01 and 1000, and the recurring structural unit

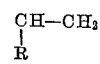

wherein R stands for the radical

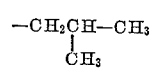

As indicated, these polymers have substantially the same refractive index throughout and are suitable for the production of transparent articles by a melt shaping process, e.g. by moulding or extrusion, the resulting articles being characterised by a degree of clarity of at least grade I (as hereinafter defined) and a degree of haze of at least group 1 (as hereinafter defined). The invention also provides rigid transparent, moulded or extruded articles of randomly crystalline spherulitic poly(4-methyl-pentene-1) having high degrees of clarity and low haze values. My polymers generally have a well-developed spherulitic structure, with mean spherulite diameters usually running from about 30 to about 75μ. Furthermore, I provide my polymer in a form particularly suitable for moulding operations, that is to say, in the form of granular particles, preferably free-flowing spheroids, having an average diameter of at least 0.05 mm. and preferably from 0.1 to 1.0 mm., and having a bulk density of from 270 to 500 gms./litre.

The polymers of the invention, and moulding and extrudates obtained therefrom, may be prepared by various methods, including those illustrated in the ensuing examples. As will be apparent from these examples, a variety of conditions may be used to prepare these products although certain conditions are essential both in the preparation of the polymer and in the subsequent melt-shaping thereof. Thus, one critical requirement is that a particular highly stereospecific catalyst should be used in the polymerisation of 4-methyl-pentene-1. A further advantage in the use of the highly stereospecific catalysts in the present invention is that these catalysts give easily handleable slurries, rather than sticky gels. These slurries are much easier to de-ash efficiently.

The catalyst employed in the manufacture of my polymers comprises titanium trichloride activated by aluminum dialkyl halide. The halide is particularly a chloride or bromide, and the alkyl groups preferably have from 1 to 8 carbon atoms. Ratios of titanium trichloride to aluminum dialkyl halide are usually in the range of about 1 to 50, particularly 1 to 6.5, parts by weight of the former to 10 parts of the latter. The aluminum dialkyl halide may be added to the catalyst as such, or generated in situ, e.g. by the action of a wide variety of third components on aluminum monoalkyl dihalide. Examples of suitable third components are phosphorus compounds, such as hexamethyl phosphoramide, trialkyl phosphates and phosphites, N,N-dimethyl acetamide, dimethyl formamide, adipamide, phosphines and hydrogen-substituted phosphines, as well as alkali metal salts, e.g. sodium and potassium chloride and preformed complexes of such salts with aluminum alkyl halides, e.g. $K[(C_2H_5)_2AlCl_2]$. The titanium trichloride may be made in a variety of ways, some of which produce more desirable catalysts than other; I particularly prefer to use titanium trichloride obtained by the reduction of titanium tetrachloride with aluminum metal according to the method of British Patent 877,050, or by the reduction of titanium tetrachloride with an aluminum alkyl according to the method of U.S. Patent 3,058,963.

As indicated above, it is also necessary for the purposes of the present invention to reduce the ash content of the polymer to a low level, i.e. below 0.02% by weight. The use of any aqueous treatment in the de-ashing operation or during any early stage in the polymer purification (i.e. while any significant amount of catalyst residues remain in the polymer in an unsolubilised condition) should also be avoided as a heavy and undesirable "blue haze" tends to result if water is used in this fashion. Further details on the de-ashing operation are outlined at a later point herein.

Overall impressions of transparency depend on two factors, i.e. clarity and haze, and according to the present invention, polymers with varying degrees of clarity and haze may be produced. Clarity is defined herein as the ability to transmit light from distant objects without scattering. It is reduced by forward scattering at small angles particularly within 0.5° of the incident beam. When the clarity is perfect, the sharpness of outline and resolution of detail of distant objects veiwed through parallel-sided specimens are unaffected. For measuring the clarity of the present polymers, the following method is used:

A sample is prepared of ⅛″ thickness. To eradicate scattering at surface scratches or imperfections, thin glass plates are stuck to the surfaces of the sample with olive oil (which has a refractive index close to that of poly-4-methyl-pentene-1). Through this sample, using a fixed observation distance of 1.5 metres, a series of charts each consisting of equal width black and white lines arranged vertically, horizontally and diagonally are viewed. The line widths in the series are 1.0, 0.6, 0.24 and 0.175 mm., corresponding to angular resolutions of 0.038, 0.029, 0.0092 and 0.0067° (semi-angle). Tests are carried out in a dark room. The charts are illuminated at the most suitable brightness, which is found to be about 500 candles/sq. metre. The sample is held close to one eye and the chart with the smallest spacing that can be resolved is noted and compared with the finest spacing that can be resolved in the absence of the sample. The results can then be expressed in terms of the loss of angular resolution due to the introduction of the sample between the eye and the charts and are independent of the limiting resolution of the eye of the observer.

The polymers and shaped articles of the present invention are characterized by a degree of clarity falling within one of the grades listed below, the degree of clarity in any particular product depending on conditions employed in the preparation and shaping of the polymer.

These grades are:

Grade I—Loss of not more than 0.0025° (semi-angle)
Grade II—No detectable loss in visual resolution.

For present purposes, haze is defined as the degree of scattering at high angles to the transmitted beam, which causes turbidity and hence reduction in contrast. To measure haze, the intensity of light scattered from semi-angles of 2½° to 90° to the incident transmitted beam is integrated and compared with the total transmittance (0 to 90°) of the sample. The method described in the American Society for Testing Materials publication "ASTM Standards on Plastics," 11th edition, 1959, as Method No. 1003–59T is employed herein for the determination of degree of haze.

The polymers and shaped articles of the present invention are characterized by a degree of haze falling within one of the following groups:

| | Percent haze |
|---|---|
| Group 1 | 0–15 |
| Group 2 | 0–5 |

The haze in a sample, like the clarity, depends on the particular conditions under which the example was made. Thus, conditions under which the polymer is shaped, e.g. moulded or extruded, have a considerable effect upon the transparency of the article produced. In particular, it has been found that rapid cooling of the melt-shaped polymer produces a high degree of transparency. For example, if mouldings of the polymer prepared and de-ashed as aforesaid are not allowed to cool in the mould but are removed from the mould at a temperature above about 200° C. and quenched in cold water (e.g. 0 to about 60° and most conveniently at about room temperature), most satisfactory degrees of transparency may be obtained. In this way, it is possible to obtain articles of clarity grade II and haze group 2 having haze values below 5%. The same quenching process may be effected in extrusion, by cooling the extrudate in a water bath or spray just after it leaves the die. It is believed that haze in articles of poly(4-methyl-pentene-1) of my specified low ash and transition metal content is caused mainly by microvoiding and that the quenching process operates by preventing or reducing microvoiding. Apparently this microvoiding is caused by crystallization of the polymer at high temperatures, for example, about 200° C., whereas less microvoiding seems to occur when the polymer is quenched so that the bulk of the crystallisation (e.g. 50 to 100% thereof) occurs at low temperatures, for example about 60° C. Spherulitic sizes in the polymer are not markedly affected by quenching.

Transparent coloured articles and articles containing light stabilisers may be prepared from poly(4-methyl-pentene-1) according to the present invention. One method of doing this is to coat the polymer granules with a solution containing an appropriate dyestuff (e.g. a "Waxolene" dyestuff) or stabiliser and then evaporate off the solvent. The coloured articles thus prepared may contain 0.0015–0.03% by weight of dyestuff.

The polymers of the invention are suitable for various uses depending on their degree of clarity and haze. Those with lesser clarity and higher haze are suitable for use in the manufacture of transparent chemical ware, and objects with translucent colours. Polymers in the highest clarity grade have numerous applications. They may be used in domestic "glass-ware," in lighting fittings where directional properties are not important (e.g. lights in passageways) and in rear lights in cars. The most transparent polymers of all (clarity grade II and haze group 2) may be used in cases where directional properties are important, e.g. for street lighting covers or motor car headlights, and also in casings for electrical apparatus, e.g. meters. The high melting point (243° C.) of poly(4-methyl-pentene-1) makes it particularly suitable for use in transparent lighting fittings where temperature resistance for short periods is important. Many other uses will be appreciated, e.g. as advertising or other road signs for which the low density of the polymer is of great advantage.

The invention is illustrated but not limited by the following examples.

*Example 1*

Under nitrogen, in anhydrous air-free conditions, 90 ml. of Phillips Pure Grade 4-methyl-pentene-1 were added to a stirred mixture of 200 ml. of "Sinarol," a high boiling (180–220° C.) petroleum fraction, 6 millimoles of $Al(C_2H_5)_2Cl$ and 2 millimoles $TiCl_3$ at 50° C. Polymerisation was continued for five hours after which the reaction mixture was de-ashed as follows:

5 ml. of acetyl acetone and 100 ml. of n-butanol were added, and the resulting mixture stirred at 50° C. for one hour under nitrogen. The mixture was kept under nitrogen overnight and the slurry filtered under nitrogen. The polymer cake was reslurried with 200 mls. "Sinarol" and 100 ml. butanol for one hour at 65° C., filtered and reslurried twice more with "Sinarol" and 200 ml. butanol, each time at 60° C., for one hour. The slurry was finally filtered and reslurried twice with 200 ml. of petroleum ether (B.P. 60° to 80°). The polymer obtained was divided into halves, half being dried in vacuo at 70° C. and half being steam distilled before drying in vacuo at 70° C. 42 gm. of a fine flowing white powder (melting point 243° C.) were isolated, having an ash content of 0.02%, and a titanium concentration below 10 parts per million.

Both fractions of the polymer were moulded under the following conditions. 7.5 gm. of dry polymer were pressed in the cold in a 2 x 2 x 1/8" preform, compression moulded at 260° C. and 20 tons/sq. inch for five minutes, and cooled rapidly in the press (i.e. to about 40° C. in from 20 to 25 minutes). Both fractions of the polymer gave mouldings giving no perceptible loss of resolution (clarity grade II): the degree of haze was 13.8% (haze group 1).

The $TiCl_3$ used in this example and all the other examples except where specifically stated, was prepared by first reducing $TiCl_4$ by adding $TiCl_4$ slowly to a stirred solution at 0° C. of aluminium ethyl sesquichloride in "Sinarol," the ratio of titanium to aluminium being substantially equimolecular. The slurry obtained was heated slowly to 85° C., held at this temperature for four hours and then cooled to room temperature (20–25° C.). The precipitate, which was used as $TiCl_3$, was washed three times with "Sinarol" before use.

*Example 2*

Under nitrogen in anhydrous air-free conditions, 90 ml. of Phillips Pure Grade 4-methyl-pentene-1 were added to a stirred mixture of 200 ml. of "Sinarol," 6 millimoles $Al(C_2H_5)_2Cl$ and 2 millimoles $TiCl_3$ at 50° C. Polymerisation was continued for 6 hours. The slurry was de-ashed by the procedure described in Example 1. 44 gm. of polymer were obtained, having an ash content below 0.02% and titanium content below 10 parts per million.

Compression mouldings, 1/8" thick, were made as in Example 1. These showed no perceptible loss in resolution (clarity grade II) and 12.3% haze (haze group 1).

*Example 3*

This example and the example following illustrate the beneficial effects of quenching mouldings according to the process of the present invention.

Under nitrogen in anhydrous air-free conditions 90 ml. of Phillips Pure Grade 4-methyl-pentene-1 were added to a stirred mixture of 200 ml. of "Sinarol," 9 ml.

and 3 millimoles $TiCl_3$ at 50° C. Polymerisation was continued for 4⅔ hours. De-ashing was carried out as in Example 1, except that 7.5 ml. of acetyl acetone were used, and the polymer washed with light petroleum (B.P. 60°–80° C.). 35 grams of granular polymer particles were obtained having a mean particle diameter of about 0.2 mm., a bulk density of 318 grams per litre, an ash content below 0.02% and a titanium content below 10 parts per million.

A compression moulding was made by pressing 7.5 gm. of dry polymer in the cold in a 2 x 2 x 1/8" preform, compression moulding at 260° C. and a pressure of 20 tons/sq. inch for 5 minutes, cooling in the press to 200° C., and quenching in water. Tests showed the clarity to be of grade II, while the haze was less than 2%. A second moulding, made similarly except that it was allowed to cool to room temperature in the press, was found to have grade I clarity, and a haze value of 27.9%.

*Example 4*

Polymerisation was conducted as in Example 3 for 3½ hours at 70° C. Non-aqueous de-ashing was carried out as in Example 3, followed by washing with light petroleum (B.P. 60–80° C.). After drying, 50 gm. of polymer were obtained having an ash content of 0.014% and a titanium content of less than 10 parts per million.

Mouldings of the polymer were made as in Example 3. Samples quenched from 200° C. had clarity grade II and haze of 3.5%. Samples allowed to cool to room temperature in the press from 260° C. had clarity grade I and haze of 21%.

*Example 5*

To 400 cc. of a high boiling petrol fraction in a dry, oxygen-free flask were added under nitrogen 9 millimoles aluminium diethyl chloride, 3 millimoles of the crystalline titanium trichloride material described in British Patent No. 877,050 and 200 cc. of 4-methylpentene-1. Polymerisation took place for 4½ hours at 58° C. At the end of this time, 7.5 ml. acetyl acetone (distilled and dried over calcium sulphate) and 100 ml. butanol (dried by the Grignard method) were added to the reaction mixture which was then heated for a further hour at 65° C. The slurry was then transferred to a filter vessel, the mother liquor drained off, and the remaining purple colour washed out with a further 200 ml. petrol. The polymer was stirred for 1 hour with 100 ml. isopropanol, sucked dry and then reslurried with 100 ml. petrol and 20 ml. isopropanol for a further 1½ hours. The liquid phase was again filtered off and the polymer was finally washed three times for ten minutes with 200 ml. batches of petroleum ether (B.P. 60–80° C.), filtered and dried. 48 gm. of polymer were obtained. A 1/8 inch section of the polymer prepared by compression moulding at 260° C. followed by quenching in cold water, showed clarity of group II and haze 4.4% (group 2).

*Example 6*

To 400 ml. of a high boiling petrol fraction in a litre flask were added, under a pressure of 1 atmosphere of hydrogen, 9 millimoles aluminium diethyl chloride, 3-millimoles $TiCl_3$ and 180 ml. of 4-methylpentene-1. Polymerisation took place for 5 hours at about 50° C. (maximum temperature 67° C.), hydrogen being present throughout. At the end of this time, 7.5 ml. acetyl acetone and 100 ml. butanol (both dried as in Example 5) were added. The slurry was heated for 1 hour at 50° C. and kept overnight. The bulk of the slurry was transferred to a de-ashing apparatus heated to 65° C. for 1¼ hours and filtered; the filtrate was deep purple. After reslurrying with a further 200 ml. petrol and 100 ml. butanol, digesting at 65° C. for 1 hour and filtering again, a yellow filtrate was obtained.

The polymer was then twice reslurried for 1 hour with 200 ml. petrol and 20 ml. butanol each time; finally it was washed twice with 200 cc. petroleum ether (B.P. 60–80° C.) and dried. A compression moulding of the polymer made at 260° C. and quenched showed clarity of group II and 11.9% haze. The ash content of the polymer was less than 0.02% and the titanium content below 10 parts per million. The melt viscosity of the polymer was appreciably lower than that of polymers made under similar conditions in the absence of hydrogen.

*Examples 7–11*

Various polymerisation temperatures were used to determine the effect of polymerisation temperature on melt viscosity of the resultant polymer. In each example (unless otherwise stated) 3 millimoles $TiCl_3$ and 9 millimoles of diethyl aluminium chloride were added to 400 ml. of high boiling petrol fraction ("Sinarol") and about 200 ml. of 4-methylpentene-1 and polymerisation conducted for about 200 ml. of 4-methyl-pentene-1 and polymerisation conducted for about 3 hours under nitrogen. De-ashing was carried out using a mixture of acetyl acetone and isopropyl alcohol (both dried as in Example 5), followed by washing three times with petroleum ether.

TABLE 1

| Example | Polymerisation Temperature, °C. | Yield (grams) | Melt Flow Index | Clarity | Haze |
|---|---|---|---|---|---|
| 7 | 70 | 92 | 1.6 | II | (*) |
| 8 | 30 | 67 | 0.08 | II | (*) |
| 9 | 39 | 60 | 0.14 | II | (*) |
| 10 | 50 | 104 | 0.26 | II | (*) |
| 11 | 60 | 76 | 0.5 | II | (*) |

*Not determined, but at least group 1.

The melt flow index is that of powder to which 1% of stabiliser has been added, measured at 260° C., using a load of 5 kilograms.

Examples 12–16

The following examples show the effect of various different de-ashing agents. Each batch of polymer was prepared by polymerising 200 ml. of 4-methyl-pentene-1 at 60° C. for 4–5½ hours in the presence of 400 ml. high boiling petrol diluent, 9 millimoles aluminium diethyl chloride and 3 millimoles $TiCl_3$. The de-ashing agent was allowed to react at 60° C. for 1 hour, and at room temperature overnight, before elution of the soluble complex with petroleum ether (B.P. 60–80° C.). Results are shown in Table 2 below.

TABLE 2

| Example | Yield polymer (grams) | De-ashing Agent (ml.) | Observations | Moulding | Ash, percent | Ti, p.p.m. | Haze, percent |
|---|---|---|---|---|---|---|---|
| 12 | 76 | n-Dodecanol (15) | Pale green complex eluted with pet. ether. | Excellent | 0.02 | <10 | 3.9 |
| 13 | 83 | n-Nonoic Acid (15) | ___do___ | V. slight blue haze | 0.01 | <10 | 4.9 |
| 14 | 94 | n-Butanol (15) Magnesium dried. | Blue-green complex eluted with pet. ether. | ___do___ | 0.01 | <10 | 6.5 |
| 15 | 88 | 3,5,5-trimethyl hexanol (15). | Pale green complex eluted with pet. ether. | ___do___ | 0.01 | <10 | 8.0 |
| 16 | (*) | Acetyl acetone (15) | Purple complex not eluted with pet. ether until isopropanol added. | Excellent | 0.01 | <10 | <5 |

*Not determined.

Haze measurements were made on a compression moulding ⅛ inch thick quenched from 265° C. Experiments were also made under the same conditions with the folowing de-ashing reagents: isopropanol, benzyl alcohol, lauryl mercaptan, dodecyl benzene sulphonic acid, nonyl phenol ethylene oxide condensate, all of which proved unsatisfactory under these conditions.

Example 17

In a 5-litre polymerisation flask connected to a de-ashing flask and a nitrogen reservoir were placed 2,500 ml. of a degassed high-boiling petrol fraction, 90 millimoles of aluminium diethyl chloride, 30 millimoles of $TiCl_3$ and 1,080 ml. of 4-methyl-pentene-1. Polymerisation was carried out for 12 hours at 60° C. De-ashing was carried out by adding 75 ml. dry acetyl acetone and 600 ml. of dry butanol and standing the slurry under nitrogen overnight. The slurry was then filtered and the polymer obtained eluted with more of the petrol fraction to wash out the dark blue complex formed. After three more washes with petrol and butanol, and finally 4 washes with petrol ether (B.P. 60–80° C.) the polymer was dried in an oven at 70° C. overnight.

The total yield of dried polymer was 623 grams, it being estimated that the amount of atactic polymer formed was 1%. The ash content of the polymer was below 0.02% and the titanium content less than 10 parts per million.

Compression mouldings ⅛ inch thick were made from the polymer under varying conditions. The results are shown in Table 3 below.

TABLE 3

| Moulding temperature | Quenching Temperature | Clarity | Haze, Percent | Crystallinity, Percent |
|---|---|---|---|---|
| 280 | 280 | II | 5.2 | 39.0 |
| 265 | 265 | II | 7 | 39.5 |
| 265 | 240 | II | 6.4 | 40.5 |
| 265 | 220 | II | 3.9 | 40.0 |
| 260 | 200 | II | 5.0 | 38.5 |
| 265 | 190 | I–II | 9.8 | 40.0 |
| 265 | 180 | (1) | 5.2 | 43.5 |
| 265 | 170 | (2) | 24.2 | 51.0 |
| 265 | 150 | (2) | 21.8 | 46.5 |
| 265 | (4) | (3) | 30.2 | 52.5 |

1 I or worse.
2 Worse than I.
3 Much worse than I.
4 Allowed to crystallise at 210 for 25 minutes, then quenched.

Each moulding was allowed to cool in the press until the quenching temperature had been reached, when it was taken out and plunged into water (at ~15° C.). This example illustrates the higher degrees of clarity and haze which are obtainable if articles are rapidly quenched from above 200° C. Percentage crystallinity was measured by X-ray diffraction.

Example 18

8 millimoles of diethyl aluminium chloride and 1 millimole of titanium trichloride were added under Grignard conditions and under nitrogen to 400 ml. of 4-methyl-pentene-1 held at its boiling point. Polymerisation was continued for 2½ hours and 46.5 gm. of polymer isolated after de-ashing with 5 ml. dry acetyl acetone and 40 ml. dry n-butanol, and drying. The polymer contained <0.01% ash and less than 10 parts per million titanium and gave an excellent ⅛" moulding (clarity II, haze 4.6%).

Example 19

60 ml. monomer were added to an air and moisture free apparatus containing 3 millimoles $TiCl_3$ and 9 millimoles aluminum ethyl sesquichloride, suspended in 100 ml. dry "Sinarol." Polymerisation was then allowed to proceed for 5 hours at a temperature of 30° C. Acetyl acetone (9 ml.) and isopropyl alcohol (18 ml.) (each dried as in Example 5) were then added to the reaction mixture which was stirred for half an hour. A good, easily handled, readily separable slurry formed. The mother liquor was then filtered off and the polymer washed three times with a mixture of equal volumes of isopropyl alcohol and petroleum ether (about 70 ml.). After two final washes with petroleum ether alone, the polymer was dried under vacuum in an oven at 70° overnight. The yield was 15.5 gm. insoluble polymer; no soluble polymer was found in the polymerisation and washing liquors. A quenched ⅛ inch thick compression moulding was made from the polymer; this had clarity grade II and haze 3.4%.

Examples 20–26

Several experiments were carried out to determine the suitability of various de-ashing processes employing principally polar media. Slurries were prepared from 50 grams 4-methyl-pentene-1 dissolved in 100 ml. petroleum ether (boiling point 60–80° C.) and polymerised at a temperature of 60° C. in the presence of a catalyst composed of 1 millimole TiCl₃ and 3 millimoles aluminum diethyl chloride. The slurry formed was stirred at 65° C. with a large volume (as shown in Table 4) of complexing agent so that it substantially modified the medium. The polymer was filtered off and washed at 65° C. with a washing agent as shown in Table 4. Quenched mouldings were made from the de-ashed polymer by the usual method. Other details are given in Table 4 below.

to continue overnight for a further 11½ hours at 60° C. Then the reaction vessel was cooled to 40° C. and 1½ litres of dry acetyl acetone admixed with 12 litres of dry isopropyl alcohol were added. The reaction mixture was heated to 60° and stirred under nitrogen for about two hours. The stirrer was then stopped and the liquor run out through a filter valve at the base of the reaction vessel. More petroleum ether was then sprayed onto the solid polymer, so that the catalyst complex was eluted; this process was continued until the whole polymer cake was white in appearance throughout. The solid polymer

TABLE 4

| Example | Complexing Agent | Washing Agent | Number of Washes | Clarity | Haze, Percent | Ash, wt. Percent | Ti, p.p.m. |
|---|---|---|---|---|---|---|---|
| 20 | Isopropanol, 50 ml | Methanol, 70 ml | 8 | II | 4.2 | <0.01 | <10 |
| 21 | do | Ethanol, 70 ml | 8 | I-II | 2.2 | 0.01 | <10 |
| 22 | do | Isopropanol, 70 ml | 8 | II | 2.6 | 0.01 | 30 |
| 23 | Butanol, 50 ml | Butanol, 70 ml | 8 | II | 3.4 | 0.01 | <10 |
| 24 | Nonanol, 50 ml | Nonanol, 70 ml | 8 | I-II | 5.2 | <0.01 | <10 |
| 25 | Ethanol, 50 ml | Ethanol, 70 ml | 8 | II | 2.5 | | |
| 26 | Methanol, 100 ml | Methanol, 70 ml | 8 | II | 2.5 | | |

It will be seen that all the above de-ashing systems are highly efficient.

*Example 27*

In a dry, oxygen free litre flask were placed 400 ml. toluene (sodium dried) and 200 ml. dry 4-methyl-pentene-1. The temperature was raised to 58° C. 9 millimoles aluminium diethyl chloride were then added followed by 3 millimoles TiCl₃ in suspension in "Sinarol." Polymerisation began at once, and was continued for four hours, with stirring. The reaction was then killed by the addition of 7.5 ml. dry acetyl acetone mixed with 100 ml. isopropyl alcohol. The reaction mixture was then stirred for one hour at 58° C., after which the slurry was filtered and the solid polymer washed four times at 64° C. with petroleum ether of boiling point 80–100° C. The polymer was then dried overnight in a vacuum oven at 70° C. A yield of 73.2 grams polymer was obtained having an ash content below 0.02%. A standard ⅛ inch quenched compression moulding was prepared, which had clarity of grade II and haze 3.7%.

*Example 28*

In a dry oxygen-free one litre flask were placed 400 ml. chlorobenzene which had been distilled from phosphorus pentoxide, together with 200 ml. dry 4-methyl-pentene-1. The temperature was raised to 60° C. and 9 millimoles aluminium diethyl chloride were then added, followed by three millimoles of a suspension of TiCl₃ in "Sinarol." Polymerisation under nitrogen with stirring was continued for five hours, ten minutes. The reaction was killed by the addition of 7.5 millimoles acetyl acetone mixed with 100 ml. isopropyl alcohol (both dried as in Example 5). The same work-up procedure was then followed as in Example 27, except that the petroleum ether used was of boiling point range 100–120° C. The polymer had an ash content below 0.02%. The quenched compression mouldings showed clarity grade II and haze 5%.

*Example 29*

In this experiment the diluent used was petroleum ether (boiling range 60–80° C.) dried using a molecular sieve and degassed; the monomer was pretreated in the same way. To a dry oxygen free 100 litre reaction vessel were added 50 litres of diluent together with 2 litres of monomer, 1.8 moles aluminium diethyl chloride and 0.6 mole titanium trichloride. The temperature of the reaction medium was maintained at 40° C. for a period of 2 hours, during which time two further additions of 2 litre quantities of monomer were made. The bath temperature was then raised to 60° C., and a further 16 litres of monomer were added in 2 litre lots at intervals over a further five and a quarter hours. Polymerisation was then allowed was reslurried with diluent, allowed to settle, filtered and again eluted; finally it was reslurried with diluent, run out of the reaction vessel and filtered under suction. It was then dried in a vacuum oven at 70° C. for 24 hours. 26 lbs. of polymer were obtained, 2.7% of which was soluble in boiling heptane. 2.8 lbs. of soluble polymer was recovered from the filtration liquors. Dried powder containing 1% stabiliser had a melt flow index at 260° C. using a 5 kilogram weight, of 1.8. The ash content of the polymer was 0.01%, titanium less than 10 parts per million, aluminium less than 5 parts per million, iron less than 10 parts per million. The standard ⅛ inch quenched compression moulding showed clarity of grade II and haze 3.5%.

*Example 30*

To 400 ml. of a purified, high boiling petrol diluent in a dry oxygen-free flask were added under nitrogen 9 millimoles aluminium diethyl chloride, 3 millimoles titanium trichloride and 200 ml. of 4-methyl-pentene-1. Polymerisation took place for 4½ hours at 58° C. At the end of this time 7.5 ml. dry acetyl acetone and 100 ml. dry n-butanol were added to the reaction mixture which was then heated for a further hour at 65° C. The slurry was then transferred to a filter vessel, the mother liquor drained off, and the remaining purple colour washed out with three successive washes of a dry mixture of 100 ml. n-butanol and 200 ml. of diluent at 65° C. for half an hour. The polymer was finally washed with petroleum ether (B.P. 60–80° C.) twice before drying in vacuo at 60° C. 99.4 gm. of granular polymer particles were obtained having an ash content below 0.02% by weight. An ⅛" quenched compression moulding showed a transmission of 77% and a haze of 4.6%, and no loss in visual resolution.

The bulk density of the polymer particles was 312 gm./litre, and the mean particle diameter was about 0.2 mm.

*Example 31*

Under anhydrous and air-free conditions to a mixture of 200 ml. high-boiling petrol diluent, 90 ml. 4-methyl-pentene-1, 8 millimoles aluminium monoethyl dichloride and 4 millimoles of hexamethylphosphoramide at 58° C. were added 8 millimoles titanium trichloride. Polymerisation took place under nitrogen over 4 hours to produce a fine slurry of polymer, which was worked up by initial reaction with 20 ml. of a dry 20% by volume solution of acetyl acetone in isopropanol and subsequent washing with dry isopropanol at 65° C. The polymer was dried in vacuo at 60° C. 53.2 gm. of granular particulate polymer was obtained, having a packing density of 270 gm./litre, and a mean particle diameter of about 0.1 mm. Ash content was below 0.02%. Quenched ⅛″ compression mouldings had a light transmission of 63%, a haze of 6.6% and loss in clarity of 0.001° (semi-angle).

*Example 32*

Under anhydrous and air-free conditions to a mixture of 200 ml. high-boiling diluent, 90 ml. 4-methyl-pentene-1 and 9 millimoles aluminium diethyl bromide were added 3 millimoles titanium trichloride at 58° C. Polymerisation under nitrogen for 4 hours gave a good handleable slurry of polymer, and the reaction was terminated by the addition of 20 ml. of a 20% by volume solution of dry acetyl acetone in dry isopropanol. After work-up as in Example 31 44 gm. of dry granular particulate polymer were obtained. The bulk density was 294 gm./litre and the mean particle size was about 0.3 mm. Ash content was below 0.02% by weight.

A ⅛″ thick quenched compression moulding had a loss in clarity of 0.002° (semi-angle) and a haze of 5%.

*Example 33*

A titanium trichloride trichloride catalyst component was prepared as follows. Titanium tetrachloride was dissolved in a purified alkane hydrocarbon fraction and placed in an air and moisture-free flask held at a temperature of 0° C. A solution of aluminium ethyl sesquichloride in the same solvent was gradually added to the flask drop by drop, with stirring. After about 14 hours the slurry of titanium trichloride was heated slowly to 95° C. and held at this temperature for a further four hours. After cooling to room temperature the titanium trichloride was separated by filtration and washed free of soluble by-products with more hydrocarbon solvent.

This catalyst component was used in the following polymerisation. Under air- and water-free conditions a mixture of a high-boiling petrol fraction (1 litre) aluminium diethyl chloride (12 millimoles) and titanium trichloride (6 millimoles, prepared as above) was stirred at 60° C. in a glass apparatus. 4-methyl-pentene-1 (283 ml., Phillips Pure Grade) was added at once, and a further 407 ml. fed over a period of two hours. The total monomer charge was thus 465 gm. After stirring for a further 17 hours at 60° C. there was obtained an excellent handleable slurry, whose particles quickly settled on standing to give a clear non-viscous supernatant liquor. The still active slurry was then transferred along a pipe to a closed de-ashing apparatus containing nitrogen and free of oxygen and water. Here the catalyst was killed and dissolved by treatment with a mixture of dry isopropanol (100 ml.) and dry acetyl acetone (20 ml.). After 15 minutes the hydrocarbon/alcohol/acetyl acetone mixture was drained off, and the resulting polymer cake was washed by reslurrying three times in appropriate quantities of dry isopropanol. The polymer was finally separated and dried to give 387 gm. of a free-flowing white powder, comprising free-flowing spheroidal particles of mean diameter about 0.3 mm. The bulk density of the powder was 455 gm./litre; its ash content was below 0.01%. A compression moulding of the polymer quenched from 280° C. into cold water showed clarity grade I and haze group 1, with a mean spherulite size of 60 microns.

*Example 34*

In a dry air-free flask were placed 347 ml. of a purified high-boiling petrol diluent, 1 millimole titanium trichloride (prepared by the method of Example 33), 2 millimoles aluminium diethyl chloride and 211 ml. 4-methyl-pentene-1 monomer. Polymerisation was carried out at 65° C. for a period of 8.2 hours. The polymer slurry was then transferred under nitrogen to a vacuum-purged de-ashing apparatus. 2 ml. dry acetyl acetone and 10 ml. dry isopropanol were added and the resulting mixture stirred under nitrogen at 80° C. for 45 minutes. Aqueous citric acid (300 ml. of a solution containing 10 gm. citric acid per litre) was then added, and the mixture stirred thoroughly, ensuring good contact between the hydrocarbon and aqueous phases for half an hour at 80° C. Then the mixture was allowed to settle and the lower aqueous phase was drained off. This treatment with citric acid solution was repeated twice, by which time the original purple colour of the hydrocarbon phase had been discharged. At this stage air was admitted to the apparatus. The polymer was finally washed with distilled water, filtered, steam distilled to remove residual diluent, and dried overnight at 60° C. in a vacuum oven.

93 gm. of polymer were obtained consisting of free-flowing spheroidal particles having an average particle size of about 0.2 millimetre and a bulk density of over 300 gm./litre. Quenched ⅛″ compression mouldings showed clarity grade II and haze of group 2. The ash content of the polymer was 0.01% by weight and the titanium content less than 10 parts per million.

The following illustrates the use of a titration procedure to determine the suitability of a de-ashing reagent.

Dry degassed "Sinarol" (200 ml.) was placed in a dry oxygen free 1-litre reaction vessel fitted with a stirrer and a thermometer, and connected to a micro-syringe. The gas in the apparatus was argon. There was then added by means of the micro-syringe 0.002 mole $TiCl_3$ (as a slurry in "Sinarol") and 0.004 mole aluminium diethyl chloride dissolved in "Sinarol." The stirrer was switched on and the vessel warmed to 55° C. Dry 3,5,5-trimethyl hexanol (noanol) was placed in the micro-syringe and added to the reaction mixture drop by drop. The colour of the material in the reaction vessel changed from red-brown to green; the end point of the titration was taken when no solids in the reaction mixture remained undissolved. At this point 3 cc. of nonanol had been added. The addition of a large excess of nonanol turned the solution a deep blue colour. These results indicated that nonanol is a suitable de-ashing reagent for the catalyst system used, and also the minimum amount of nonanol required to dissolve a specified quantity of catalyst. In practice it is of course customary to use considerably more than the minimum to ensure complete reaction. The use of nonanol as a complexing agent is exemplified in Examples 15 and 24. The same experimental procedure was useful for indiacting other systems for removing catalyst residues, what are effective reagents for this purpose and the minimum quantities in which they may be used.

In the foregoing examples, the polymerisations of 4-methyl-pentene-1 according to the present invention were carried out at atmospheric pressure, although, if desired, elevated pressures, e.g. pressures sufficient to keep the monomer in the liquid phase, may also be used. Usually the polymerisation temperature should be within the range of 30 to 70° C., although the actual temperature selected for use in any specific situation will depend upon other operating factors as discussed below. Temperatures substantially in excess of 70° C. should be generally avoided since the resulting polymer slurries are difficult to handle.

The above examples also show that rapid cooling or quenching of the mouldings and extrudates is essential to produce articles having the highest degree of clarity and freedom from haze. Usually, the moulding or extruding operation is carried out at temperatures of the order of 260 to 320° C., and, as indicated, heretofore, the melt shaped articles should be quenched before they have cooled below 200° C. This quenching operation should be such as to reduce the temperature of the article quickly to 60° C. or below, usually within from a few seconds to 2 minutes.

On the matter of ash removal, the requirements for carrying out this step are stringent and specific. Oxygen and water must be excluded at the catalyst inactivation and solubilisation stage, and preferably also while the solubilised catalyst residues are being washed out of the polymer. Thus, for example, some methods of ash removal suitable for the production of transparent oriented polypropylene films are quite unsuitable for the production of polymers of 4-methyl-pentene-1 capable of being moulded or extruded to transparent shapes.

As indicated heretofore, one essential requirement for effective ash removal herein is the formation of an easily handleable polymer slurry during the polymerisation. The important feature of an easily handleable slurry is that it is separable, i.e. it is one in which the liquid phase can be readily removed from the solid phase. Methods which may be used to separate the two phases in suitable cases include centrifuging, filtration, washing with other liquids, decantation, or any combination of these processes.

Separability of the solid phase from the liquid phase is important because in the subsequent de-ashing process, catalyst residues are made to dissolve in the liquid phase. Accordingly, if the liquid and solid phases cannot be separated, catalyst residues remain in the polymer and transparent material cannot be obtained. For this reason, distillation is not a suitable method for removing the liquid phase.

It will be appreciated that if the slurry is separable, the original liquid phase may be removed and the polymer can be reslurried and de-ashed in a different medium from that in which the polymerisation took place. Additionally, where a slurry is thick and difficult to separate because it contains too high a proportion of suspended solids, separation may be made easier by dilution. If, however, a thick slurry contains more than about 10% of its total polymer content dissolved in the diluent, it will generally not be possible to render it separable by dilution.

The following are the principal factors which affect the separability of a polymer slurry:
(1) The temperature of polymerisation and separation.
(2) The nature of the catalyst.
(3) The nature of the diluent.

Each of the three conditions noted above must generally be adjusted to obtain a separable slurry. Increase in temperature of polymerisation increases the proportion of atactic polymer formed, and also gives rise to isotactic polymer of lower molecular weight, which dissolves more readily at all temperatures and particularly at the higher temperature at which it is formed. Provided a suitably stereospecific catalyst is used, the highest temperature at which a separable slurry can be obtained is that at which the isotactic polymer begins to be swollen by the diluent, or to dissolve in it on an appreciable scale. The temperature at the beginning of polymerisation is the most important in determining whether a separable slurry is obtained, i.e. if polymerisation is begun at a relatively low temperature, the temperature may thereafter be raised (see British Patent No. 940,145).

Subject to the necessity of producing a separable slurry, it is generally desirable to polymerise at as high a temperature as possible, because the rate of polymerisation is then faster. However, the higher the temperature of polymerisation, the lower the molecular weight of polymer produced and to obtain polymer grades of higher molecular weight it may, therefore, be necessary to use temperatures below those which give the best rate consistent with separability. The molecular weight of the polymer formed may also be reduced by the addition of certain polymerisation modifiers, notably hydrogen, to the reaction mixture as evidenced by Example 10 herein.

The possibility of obtaining a separable slurry at all depends on the nature of the catalyst employed. Unless the catalyst has a stereospecific action which gives rise to a high proportion of isotactic polymer it will produce under all practical operating conditions intractable gels instead of separable slurries. Generally, the more stereospecific the catalyst, the higher the maximum temperature which may be used in polymerisation.

As stated above, the catalyst for use in my invention comprises titanium trichloride activated by an aluminium dialkyl halide, the alkyl groups each containing conveniently up to 8 and preferably up to 5 carbon atoms.

While all forms of titanium trichloride give stereospecific catalysts, some give greater polymerisation rates, or a higher proportion of isotactic polymer, or have other advantages over their fellows. I particularly prefer to use a catalyst obtained by the reduction of titanium tetrachloride in alkane solution at a temperature of ±20° C. using aluminium dialkyl monochloride (generally in the form of sesquichloride). Before use, this catalyst is optionally washed with an alkane to free it from hydrocarbon-soluble by-products, or heated one or more times for periods of from 10 minutes to 8 hours at temperatures of from 60 to 150° C., or both, before use. Curiously enough, it is found that particularly beneficial results are obtained by carrying out the reduction by addition of the alkyl (preferably in alkane solution) gradually to the titanium tetrachloride solution; the resulting catalysts give particularly good slurries at high polymer solids content levels and also produce polymer powder of a most desirably high packing density.

The titanium trichloride/aluminium dialkyl halide catalyst used in my invention is particularly useful for commercial operation because it can give free-flowing separable slurries at relatively high temperatures, e.g. 40 to 75° C., having a high content of suspended solid polymer, i.e. in the range 250 to 450 grams solid polymer per litre of diluent.

The nature of the diluent determines the temperature at which isotactic polymer will begin to be swollen by or dissolved in the diluent appreciably. Suitable diluents include petroleum ether (B.P. 60–80° C.), a petrol fraction boiling between 180 and 220° C. ("Sinarol"), toluene, chlorobenzene and the monomer itself. Each of these diluents will give, in suitable circumstances, separable slurries at temperatures at least as high as 60° C.

It will also be apparent from the foregoing examples that the polymerisation is carried out in the substantial absence of air and water while nitrogen is often used to purge the apparatus beforehand. If it is desired to conduct the reaction above the boiling point of 4-methyl-pentene-1 (54° C.), super-atmospheric pressure may be applied. The monomer feed may contain other constituents which do not interfere with the course of polymerisation. Thus, material containing as much as 20% of cis and trans 4-methyl-pentene-2 has been successfully polymerised.

To treat the slurry obtained to reduce its ash content sufficiently, it is necessary to treat it, or at least its polymer content, in the absence of water and oxygen with sufficient of an effective reagent to react with all the catalyst of the polymerisation and convert it to products soluble in the medium, as hereinafter defined. The polymer is then preferably washed with a water-free, organic wash liquid until all colour has been removed and then separated from the wash liquid. However, once all the catalyst has been solubilised, it may be found permissible and convenient to wash with an aqueous liquid. Generally this will not be found suitable unless the original concentration of catalyst in the polymer was relatively low.

From the foregoing examples, and additional disclosures, it will be apparent that, according to the present invention, 4-methyl-pentene-1 is polymerised, under air- and moisture-free conditions, in a diluent selected from the group consisting of an inert hydrocarbon liquid, excess of the monomer itself and a chlorinated aromatic hydrocarbon, and in the presence of a stereospecific catalyst comprising titanium trichloride and aluminium alkyl chloride whereby there is obtained a separable slurry of poly-4-methyl-pentene-1 in diluent; and thereafter de-ashing the polymer under water-free conditions so that the ash content thereof does not exceed 0.02% by weight of the polymer and the titanium content is below 50 p.p.m., the de-ashing operation involving treatment of the slurry, or at least its dispersed polymer content in the absence of water and oxygen with sufficient of an effective de-ashing reagent to react with all of the catalyst and to convert the same to products soluble in the selected liquid medium. Preferably, the treatment with the de-ashing agent is sufficient to reduce the titanium content to less than 10 parts per million. Following this treatment, the polymer is, as mentioned previously, preferably washed with a water-free organic liquid at least until all visible colour has been removed and the polymer is then separated from residual wash liquid.

It will be apparent that my process must be chosen so that only very little atactic polymer is produced and that the solid polymer extracted has a high degree of stereospecificity. Thus the solid polymer normally has a polymer component extractable with boiling heptane not greater than 5% by weight.

It will be appreciated that the selected liqiud medium referred to above may comprise the dispersion phase of the slurry (including any unreacted reagent plus any other organic solvent which may be added), or, if the dispersed polymer has previously been separated from the dispersion phase of the slurry, any unreacted reagent plus any other organic solvent which might have been added to the polymer and any of the dispersion phase of the slurry occluded with the dispersed polymer, e.g. occluded on the polymer if it was separated from the polymerisation diluent by filtration or centrifuging.

The amount of de-ashing agent utilised should be at least sufficient to react with all the catalyst used in the polymerisation and provide products which will dissolve in the selected liquid medium. This amount may be determined by titrating, on a laboratory scale, the reagent, admixed if desired, with some of the medium, against the catalyst dispersed, and partly dissolved, in all of the remaining medium; the end point being when all the catalyst has been converted to soluble products. It will be appreciated that the suitability of a de-ashing reagent will depend upon the nature of the liquid medium involved. It has been found by the titration experiment referred to above that when the medium is primarily hydrocarbon, the higher alcohols, higher acids and higher amines (e.g. carbon chain of at least 8 carbon atoms) are suitable reagents for reacting with all of the catalyst to form products soluble in the medium. Examples of such reagents are 3,5,5-trimethyl hexanol, dodecanol, and n-nonoic acid. Mixtures of reagents such as mixtures of acetyl acetone and isopropyl alcohol are also suitable, such mixtures being presumably effective by causing some modification of the ability of the medium to dissolve the products derived from the catalyst. If the medium is primarily a polar one, or more particularly a polar one with active hydrogen atoms, many other reagents are suitable. Such an effective system is one in which a lower alcohol as illustrated in Examples 20–26 is used, both as reagent and medium.

Washing is preferably carried out using a water-free organic liquid, which may be a hydrocarbon, e.g. that used as diluent for the polymerisation, or it may be more of the de-ashing reagent, e.g. an alcohol, including methanol, ethanol, isopropanol or butanol. It may be found convenient to deactivate and solubilise with one de-ashing reagent (say an acetyl acetone isopropanol mixture) and to wash out catalyst residues with another (say isopropanol). In cases where the concentration of catalyst in the polymer is low it may be found practicable and convenient to wash out the catalyst residues with water or an aqueous solution; it is, however, still found to be necessary to inactivate and solubilise the catalyst in the absence of air or water.

If insufficient de-ashing reagent is used or if a reagent is used which cannot convert all the catalyst to soluble products, when the polymer is washed to remove all visible colour, the polymer will still have a significant ash content, even though the polymer may be colourless, and it is not capable of being moulded or extruded to transparent articles of the kind contemplated and described herein. The titration test referred to above will generally serve as an effective guide in selecting the de-ashing reagent.

Effective reagents for the de-ashing operation should be substantially water-free, and oxygen-free, and it is generally preferred that wash liquids should be likewise.

While it is necessary that the polymer ash content should be reduced to less than 0.02% by weight and the Ti content to below 50 parts per million by treatment with the de-ashing reagent as described above, it is preferred that the treatment be carried out as completely as possible, that is, until polymer is obtained with a Ti content below 10 parts per million in order to obtain the highest grades of transparency in articles. As will be evident from the preceding examples, the de-ashing treatment may be conducted by simply stirring the selected reagent with a slurry of the polymer and washing. The time required for the treatment depends on the reagent and the medium involved but, as a rule, the treatment can be expedited by conducting it an elevated temperature, such as 65° C., using an excess of the reagent.

Wash liquid, i.e. the liquid resulting from washing the polymer after the de-ashing operation, may be separated from the polymer by filtration or centrifuging followed by evaporative methods if it is of low boiling point, e.g. if it is butanol, a low boiling petroleum ether or 4-methyl-pentene-1 itself. However, if the wash liquid is not low boiling, e.g. if it is a hydrocarbon liquid of high boiling point, it may be separated by filtration or centrifuging, washed from the polymer by a low boiling liquid (e.g. butanol) which in turn may be separated by evaporative methods. An alternative method for removing quantities of the wash liquid after filtration or centrifuging is by steam distillation followed by drying the polymer. Final removal of a low boiling wash liquid may be satisfactorily accomplished by such methods as passing a gas (preferably for safety an inert gas such as nitrogen) through a cake of polymer particles on a filter, a centrifuge or a fluidised bed and in an evaporative extruder.

Manufacture of shaped articles from the present polymers may be carried out by a variety of known techniques, e.g. extrusion, injection moulding, compression moulding, powder coating, blow moulding, and methods such as that of British specification No. 821,634, provided that in each case the hot article is cooled rapidly from the molten state by some suitable process, e.g. in the case of compression moulding by withdrawing the hot article from the mould and quenching it with water, or in the case of extrusion, by passing the extrudate directly into a cooling bath. In injection moulding, where the polymer is forced into a cold mould, small articles are automatically quenched; but in fabricating larger articles it may be necessary to water cool the moulds.

Because of the optical and mechanical properties of the polymers of the present invention, they are very suitable for fabricating into bottles and other transparent ware which need to be sterilised, such as articles for use in the foodstuffs industry, hospital and pharmaceutical industries and the milk industry, e.g. milk bottles. These polymers also have very good resistance to chemical attack and are suitable for fabricating into laboratory and chemical plant equipment, e.g. bottles, burettes, flasks and pipes. It should be noted, however, that exposure to hydrocarbons, to boiling water, or some polar solvents over a period can cause clouding of the materials. The polymers further have very good electrical properties and are well suited as transparent insulators for electrical conductors. These products also find uses in the lighting fittings field and they are useful as decorative material for which purpose they may be coloured and if desired, metallised. If they are to be exposed to ultra violet light, they should contain a stabiliser against degradation by U.V. light. Like other hydrocarbon polymers, they normally require to contain antioxidants.

It will be recognised that the melt-shaped products of the invention are distinguishable from filaments and thin flexible films. In particular, the mouldings or extrudates of the invention are generally of sufficient thickness to be rigid. For example, the products may have a thickness of at least about 1/32 inch, up to one inch or even more. As indicated above, it is highly unexpected that glass-like transparent articles of such thickness can be obtained using the crystalline polymer of the present invention.

It will be appreciated that various other modifications may be made in the invention described herein without deviating from the scope thereof as set forth in the following claims wherein I claim:

1. A melt-shaped article of sufficient sectional thickness to be rigid comprising a solid crystalline polymer of 4-methyl-pentene-1 having an ash content of less than 0.02% by weight, a melt flow index (measured by ASTM Method 1238–57T using a 5 kg. weight at 260° C.) of between 0.01 and 1000 and a density of 0.82 to 0.86 gram per cc. and the recurring structural unit

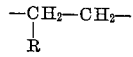

where R stands for the radical

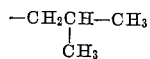

said article being further characterized by high clarity such that when expressed in terms of loss of angular resolution through an 1/8″ section the loss does not exceed 0.0025° (semi-angle), and a low haze value not exceeding 15% when the intensity of light scattered from 2½ to 90° to the incident beam through an 1/8″ section is integrated and compared with total transmittance (0 to 90°).

2. A process for making a melt-shaped article according to claim 1 which comprises melting a solid crystalline polymer of 4-methyl-pentene-1 having an ash content of less than 0.02% by weight, a melt flow index (measured by ASTM Method 1238–57T using a 5 kg. weight at 260°) of between 0.01 and 1000 and a density of 0.82 to 0.86 gram per cc. and the recurring structural unit

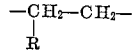

where R stands for the radical

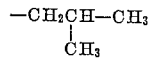

shaping the molten polymer into said article and quenching the article so formed from a temperature above 200° C.

References Cited
UNITED STATES PATENTS
2,921,057 1/1960 Mertzweiller _____ 260—94.9
2,957,225 10/1960 Welch _____ 260—94.9
3,009,907 11/1961 Mahlman et al. _____ 260—94.9
3,098,845 7/1963 Cull et al. _____ 260—94.9

FOREIGN PATENTS
549,891 1/1957 Belgium.
223,196 11/1957 Australia.

JOSEPH L. SCHOFER, *Primary Examiner.*
L. EDELMAN, *Assistant Examiner.*